Figure 1:
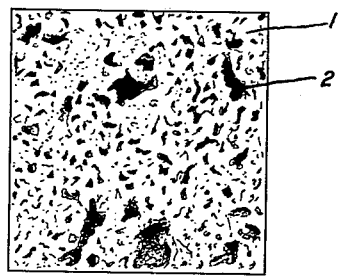

Oct. 16, 1962  R. A. CHEGWIDDEN  3,059,194
MICROWAVE FERRITE DEVICES
Filed Dec. 29, 1958

INVENTOR
R. A. CHEGWIDDEN
BY
*George S. Indig*
ATTORNEY 3,059,194
MICROWAVE FERRITE DEVICES
Raymond A. Chegwidden, Chatham, N.J., assignor to Bell Telephone Laboratories, Incorporated, New York, N.Y., a corporation of New York
Filed Dec. 29, 1958, Ser. No. 783,375
7 Claims. (Cl. 333—24)

This invention relates to methods of making ferrite compositions of particular value in microwave ferrite devices.

As is well known, it is generally desirable for ferrite compositions that are to be used in certain microwave devices to have broad-band resonance characteristics, low forward losses and high back losses. Among the more popular ferrite compositions used for such applications are certain members of the manganese-magnesium ferrite system, for example a copper-manganese-magnesium ferrite represented by the following approximate formula wherein the metallic constituents are expressed on a 100 percent by weight basis, the non-metallic constituent being oxygen:

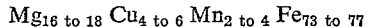
$$Mg_{16 \text{ to } 18} Cu_{4 \text{ to } 6} Mn_{2 \text{ to } 4} Fe_{73 \text{ to } 77}$$

Compositions in this range typically have flux densities of 1960 gausses, forward and reverse losses of 0.36 decibel and 26 decibels, respectively, in the 5.9 kilomegacycles region and forward losses of 0.37 decibel and reverse losses of 23 decibels in the 6.4 kilomegacycles region.

In accordance with the present invention, it has been discovered that the characteristics of this ferrite composition can be still further improved by the addition of refractory compounds such as aluminum oxide, zirconium oxide, beryllium oxide and titanium oxide to the ferrite composition. Such compounds resist ordinary sintering thereby making them difficult to put into solution under normal ferrite forming reactions. More specifically, it has been found that the addition of small amounts of a refractory compound, in the order of 0.1 percent by weight to one percent by weight, to a calcined mixture of this ferrite composition results in a lowering of the forward losses and a raising of the reverse losses. Further, the broad-band characteristic of this composition is enhanced.

A method of preparing ferrite articles of the compositions disclosed herein is outlined below. Since known ferrite processing steps are incorporated in the process of this invention, modifications in this method will be apparent to those skilled in the art.

The conventional starting materials used in preparing the known manganese-magnesium-copper ferrites of the prior art can be used in practicing applicant's invention as, for example, manganese oxide, manganese carbonate, manganese hydroxide, manganese oxalate, magnesium oxide, magnesium carbonate, magnesium hydroxide, magnesium oxalate, copper oxide, copper carbonate, copper hydroxide, copper oxalate, or other compounds which with firing will yield manganese oxide, magnesium oxide, and copper oxide.

The ingredients are first mixed in a paste mixer as a slurry. Though an aqueous slurry is generally used, the water solubility of some of the component compounds contemplated as possibilities above may dictate the preferential use of a non-aqueous liquid as, for example, acetone, carbon tetrachloride or ethanol. After mixing, the paste or slurry may be dried by removal of the supernatant liquid, by filtration, or, if a volatile liquid has been used, by evaporation. The wet filter cake thus obtained may be dried, for example by heating for sixteen hours at 105° C., and granulated, for example by forcing the material through stainless steel screens. The ceramic material from which the liquid has been removed in such a manner is then calcined in accordance with accepted practices. Exemplary compositions are prepared by heating the ceramic in an oxidizing atmosphere such as air over an approximate temperature range of from 800° C. to 1100° C. for a period of approximately two to twenty hours.

The agglomerations formed in the calcining step are broken up by ball milling a period of approximately five to twenty hours in water or other carrier, such as acetone, ethanol or carbon tetrachloride, having been found suitable. During this ball-milling step a small amount of a refractory compound is added to the mixture.

In accordance with accepted practices, a binder and lubricant may also be added during the ball-milling cycle. For example, polyvinyl alcohol or "Opal wax" (hydrogenated castor oil), in the case of milling with water, or paraffin or Halowax (chlorinated naphthalene), if organic carriers are used, may be incorporated into the mixture. Binder may be added to the solvent, in which case its solution is affected by the carrier in the ball mill, or may be added in the form of a solution in a similar solvent. Six to nine percent by weight of Opal wax in relation to the dry ceramic ingredients has proven satisfactory.

The ball-milled slurry is then dried by evaporation or filtration. The dried solids may then be granulated into particles of more uniform size by forcing the solids through a screen. For example, a No. 20 U.S. Standard sieve with a mesh size of 0.84 millimeter has been used for this purpose. Alternatively, the ball-milled slurry may be separated from the steel balls of the ball-milling operation, allowed to settle, for, for example, forty-eight hours, and decanted, leaving a thick sludge.

The particles or sludge are next formed into the desired configuration under high pressures as, for example, 5,000 pounds per square inch to 50,000 pounds per square inch. Appropriate pressures suitable in the obtaining of the desired configurations are known to those skilled in the art. Where a sludge is used in this molding process the resulting article preferably is air dried at room temperature for a period of, for example, forty-eight to ninety-six hours. In the case where a binder has been included, the pressed articles are dewaxed by heating. Such heating may be carried out in air or other medium. A convenient dewaxing schedule comprises bringing the pressed parts to a temperature up to 400° C. gradually to prevent thermal shock as, for example, over a period of about six hours, and then maintaining at 400° C. for another six hours. This dewaxing step, designed for articles of intermediate size, may be modified by lengthening or shortening the heating period for larger or smaller wax-containing bodies.

The shaped articles next undergo final firing to form a magnesium-copper-manganese ferrite containing a substantially unreacted refractory compound. In general the firing is not critical since the form of the refractory compound and the time of introduction prevent substantial reaction. Generally, firing times and conditions are those for normal ferrite reactions, for example, 1250° C. to 1350° C. for two hours has proven satisfactory. The firing and subsequent cooling are carried out in an oxygen-containing atmosphere.

Specific examples of two ferrites prepared by the above-described process, together with magnetic measurements, are given below.

*Example 1*

108.69 grams of ferric oxide, 8.77 grams of copper carbonate, 37.77 grams of magnesium carbonate, and 7.09 grams of manganese carbonate were dry-mixed after weighing. This starting composition corresponds to the following formula based on a 100 percent by weight metal basis:

$$Fe_{75.15}Mn_{3.16}Mg_{16.82}Cu_{4.67}$$

The mixed ingredients were funneled into an Abbe-Lenert mixer and enough distilled water was added thereto to form a slurry. After mixing, the slurry was passed into a Büchner funnel and the solids separated. The wet filter cake thus obtained was dried for sixteen hours at 105° C. and was granulated by forcing the material through 10- and 20-mesh steel screens. The dry filter cake thus obtained was then calcined in air at a temperature of around 900° C. for approximately sixteen hours. After the calcination the mixture was broken into particles by ball milling in water for approximately twelve hours. At the start of the ball-milling cycle five-tenths percent by weight of aluminum oxide based on the calcined ingredients was added to the mixture. After ball milling the slurry was separated from the steel balls by pouring through a 4-mesh screen into a three-gallon glass container. After allowing to settle for forty-eight hours the slurry was decanted, leaving a thick sludge. The sludge was then shaped into the desired form under a pressure of 5,000 pounds per square inch. The shaped article was allowed to dry at room temperature for a period of forty-eight hours. Final firing of the article was carried out in an oxygen atmosphere at a temperature of 1280° C. for two hours. The article was then allowed to cool in an oxygen atmosphere.

The following measurements listed below were made on this reaction product:

| Flux Density (gausses) | Kilomegacycles 5.9 | Kilomegacycles 6.4 |
| --- | --- | --- |
| 1965 | 0.12 db [1]<br>27 db [2] | 0.23 db [1].<br>30 db [2]. |

[1] Forward loss.
[2] Reverse loss.

*Example 2*

106.4 parts by weight ferric oxide, 8.9 parts by weight copper carbonate, 38.2 parts by weight magnesium carbonate and 7.2 parts by weight manganese carbonate were formed into a shaped article by the previously described process. This starting composition corresponds to the following formula based on a 100 percent metal basis:

$$Mg_{17.05}Cu_{4.95}Al_{1.26}Fe_{73.55}Mn_{3.19}$$

To this calcined mixture 0.2 percent by weight aluminum oxide was added.

The various measurements listed below were made on the reaction product formed by this process:

| Flux Density (gausses) | Forward Loss 5.9 Kilomegacycles | Forward Loss 6.4 Kilomegacycles |
| --- | --- | --- |
| 1948 | 0.18 db | 0.28 db. |

As can be seen from these examples, the ferrite compositions made in accordance with the methods of this invention exhibit low forward losses and high back losses. Further, these compositions exhibit broad-band resonance characteristics as evidenced by comparison of the losses measured at both 5.9 kilomegacycles and 6.4 kilomegacycles.

Figure 2:
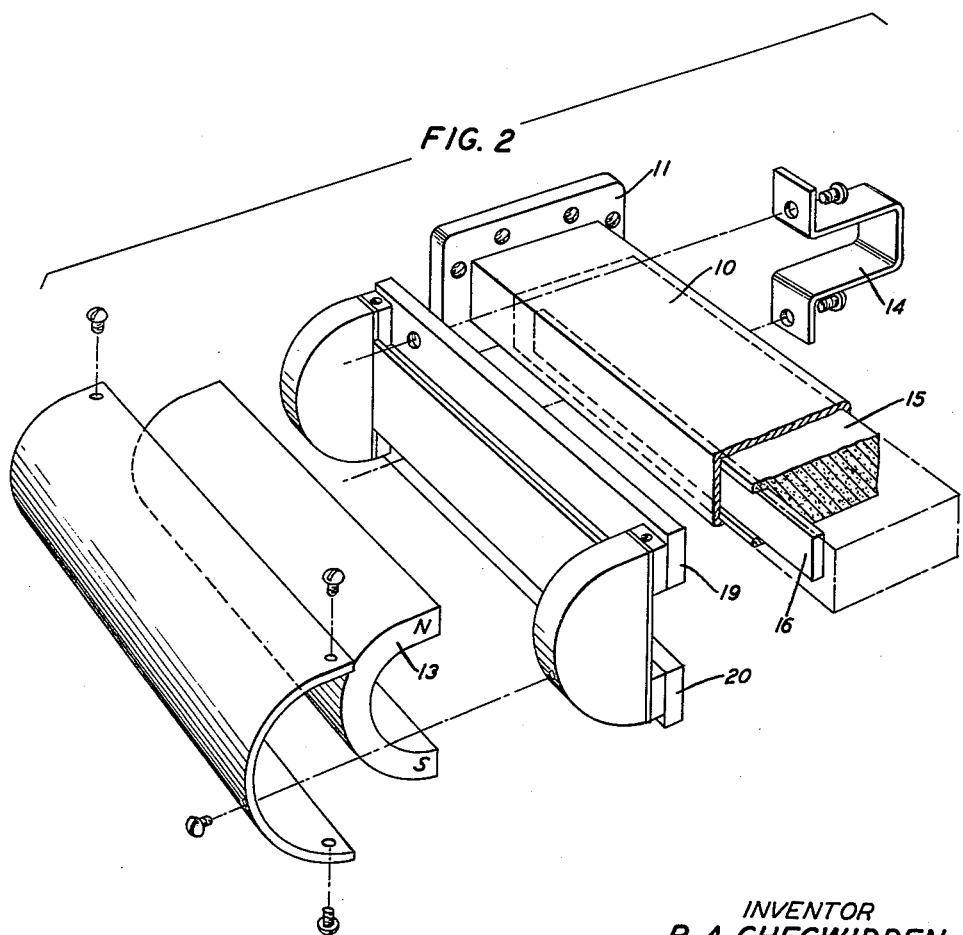

The invention and other features thereof will be understood more clearly and fully from the following detailed description with reference to the accompanying drawings, in which:

FIG. 1 is a cross-sectional view magnified 200 times depicting a ferrite composition containing unreacted aluminum oxide made by methods of this invention; and FIG. 2 is a perspective view of a microwave device of the field displacement type utilizing a ferrite isolator of material prepared by methods of this invention.

Referring again to FIG. 1, there is depicted a ferrite composition 1 having dispersed therein unreacted particles of aluminum oxide 2. This composition was obtained by adding 0.5 percent by weight of aluminum oxide to a calcined mixture formed by reacting a starting composition corresponding to the following formula based on a 100 percent metal basis:

$$Mg_{16.8}Cu_{4.9}Fe_{75.1}Mn_{8.2}$$

The resulting mixture was then formed under normal ferrite conditions.

FIG. 2 depicts a microwave device well known in the art utilizing a ferrite element formed by the methods of this invention. The operation of this device is described in Patent 2,834,946 to Sansalone et al. Briefly, there is shown an exterior view of a field displacement type isolator comprising wave guide 10 of rectangular cross section with terminal flanges 11 provided for convenience in connecting the wave guide 10 into a wave guide assembly. For clarity in the drawing, only one flange 11 is shown. A permanent magnet 13 of generally U-shaped cross section and of length comparable with that of the wave guide 10 is shown involving a portion of the wave guide and secured in position by clamps such as clamp 14. In addition, there is shown a holder 15 as of foam polystyrene and a ferrite element 16, the latter formed by methods of this invention, on one face thereof. The magnet 13 is provided with pole pieces 19 and 20. The holder 15 contains a recess accurately positioned to support the ferrite element 16 in a preferred location within the wave guide 10. The magnet 13 is so placed that it provides a suitable biasing flux through the element 16.

What is claimed is:

1. A method of making ferrite compositions comprising adding to a calcined mixture of the oxides of magnesium, copper, and manganese having a starting composition corresponding to the following formula based on a 100 percent by weight metal basis:

$$Mg_{16 \text{ to } 18}Cu_{4 \text{ to } 6}Mn_{2 \text{ to } 4}Fe_{73 \text{ to } 77}$$

from 0.1 percent to one percent by weight of a refractory compound selected from the group consisting of aluminum oxide, zirconium oxide, beryllium oxide and titanium oxide, shaping the resultant material into the desired configuration under pressure of from about 5,000 pounds per square inch to 50,000 pounds per square inch and firing the resulting material in an oxidizing atmosphere at a temperature from about 1250° C. to 1350° C. such that a manganese-copper-magnesium ferrite is formed containing a substantially unreacted refractory compound.

2. The process as defined in claim 1 wherein the refractory compound is aluminum oxide.

3. The process as defined in claim 2 wherein 0.2 percent to 0.5 percent by weight aluminum oxide is added to the calcined mixture.

4. The process as defined in claim 3 wherein 0.2 percent by weight aluminum oxide is added to the calcined mixture.

5. The process as defined in claim 3 wherein 0.5 percent by weight aluminum oxide is added to the calcined mixture.

6. A microwave ferrite device comprising a waveguide, a ferrite element positioned within said waveguide and a permanent magnet at least partially enclosing said waveguide and being so placed as to provide suitable biasing flux though said ferrite element, said ferrite element being made by a method comprising adding to a calcined mixture of the oxides of magnesium, copper and manganese having a starting composition corresponding to the following formula based on a 100 percent by weight metal basis:

$$Mg_{16 \text{ to } 18}Cu_{4 \text{ to } 6}Mn_{2 \text{ to } 4}Fe_{73 \text{ to } 77}$$

from 0.1 percent to one percent by weight of a refractory compound selected from the group consisting of aluminum oxide, zirconium oxide, beryllium oxide and titanium oxide, shaping the resultant material into the desired configuration under pressure of from about 5,000 pounds per square inch to 50,000 pounds per square inch and firing the resulting material in an oxidizing atmosphere at a temperature from about 1250° C. to 1350° C. such that a manganese-copper-magnesium ferrite is formed containing a substantially unreacted refractory compound.

7. The mcrowave ferrite device defined in claim 6 wherein the refractory compound is aluminum oxide.

References Cited in the file of this patent

UNITED STATES PATENTS

| | | |
|---|---|---|
| 2,542,530 | Snoek | Oct. 28, 1948 |
| 2,565,861 | Leverenz et al. | Aug. 28, 1951 |
| 2,576,456 | Harvey et al. | Nov. 27, 1951 |
| 2,736,708 | Crowley et al. | Feb. 28, 1956 |
| 2,883,629 | Suhl | Apr. 21, 1959 |
| 2,886,530 | Greger | May 12, 1959 |

FOREIGN PATENTS

| | | |
|---|---|---|
| 71 | Philippines | Aug. 10, 1950 |
| 697,219 | Great Britain | Sept. 16, 1953 |
| 735,375 | Great Britain | Aug. 17, 1955 |
| 737,284 | Great Britain | Sept. 21, 1955 |
| 760,035 | Great Britain | Oct. 31, 1956 |

OTHER REFERENCES

Gorter, Philips Res. Reports, vol. 9, pp. 428–437, December 1954.

Kordes et al.: Chemical Abstracts, vol. 46, col. 4411, May 25, 1952.